Feb. 6, 1940.　　　　E. M. PFAUSER　　　　2,188,957
PACKING
Filed March 11, 1936
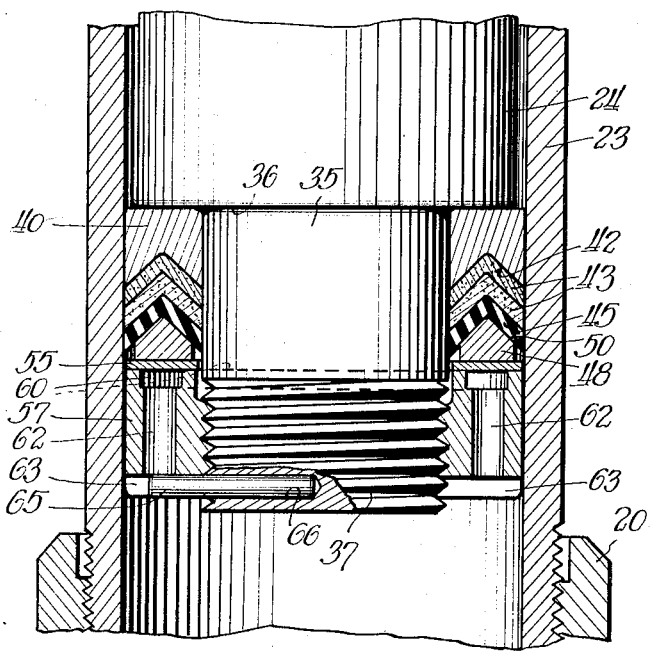
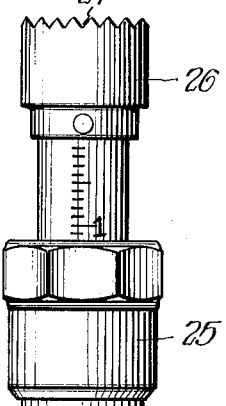
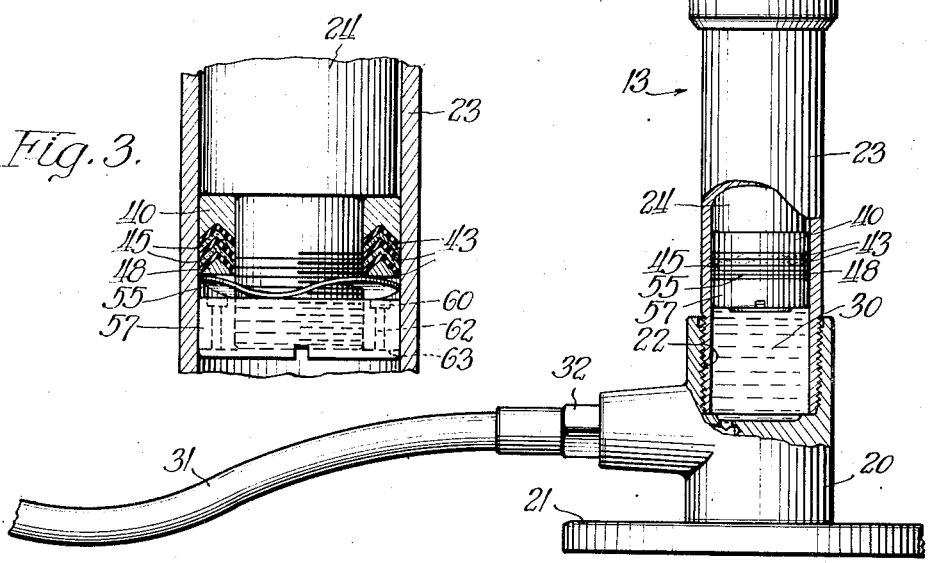
Inventor:
Edward M. Pfauser

UNITED STATES PATENT OFFICE 2,188,957

PACKING

Edward M. Pfauser, Elm Grove, Wis., assignor to Blackhawk Mfg. Co., Milwaukee, Wis., a corporation of Wisconsin Application March 11, 1936, Serial No. 68,244

1 Claim. (Cl. 309—23)

The present invention relates generally to packing for pistons, piston rods and the like, operable under or subjected to hydraulic pressure, and the principal object of the present invention is the provision of a new and improved packing which is not likely to leak or permit seepage, whether under load or not, and which is not likely to bind or stick under continued and sustained loads.

Packing cups and rings formed of leather, fabric, and similar materials have been used for a long time, and such packing, generally speaking, has proven satisfactory. However, one of the disadvantages of leather packing cups and the like is that the porosity of the material permits a more or less limited amount of seepage of the confined liquid, usually oil, especially when a device stands for some considerable length of time without any load. Under pressure, leather operates fairly satisfactorily and with little seepage, but under light or no load conditions it appears that the capillary porosity of the material permits a continued seepage. While this seepage is not great, it has the disadvantage that at the end of the stroke there may occur a rather sudden ejection of a small amount of seepage liquid through the outer packing. While this is merely the ejection at the end of the stroke of the slight amount of liquid which has seeped into the clearance space about the plunger, it gives the impression that the unit is leaking badly, whereas the actual leakage may be relatively small. Moreover, the leakage that does occur tends to discolor the associated part or parts, and this further increases the impression that the machine is not functioning as smoothly and in such a leak-tight manner as is desired.

Other attempts have been made to secure a satisfactory packing by the use of rubber rings and the like, but the use of rubber packing members has not been found to be successful. Where the unit stands under pressure for a considerable length of time, and especially where the rubber packing members have skirts or other parts with a considerable area of contact with the cylinder or other part, the rubber packing tends to become bound or stuck to the cylinder wall. Such rubber packing members are usually fairly flexible, and the continuously applied pressure seems to press the rubber members into such intimate contact with the associated surface and with such force that apparently the film of oil between the packing and the adjacent surface is squeezed out, leaving the rubber in direct contact with the metal under pressure and thereby permitting the rubber to seize. When this occurs, the next or subsequent operation of the unit is rendered difficult and unsatisfactory.

With the foregoing factors in mind, the principal object of the present invention is to provide a packing in which members of leather and of flexible rubber-like material are employed, securing the advantages of each but without the disadvantages of either. According to the principles of the present invention, packing members are employed and are arranged so that the leather cups and the cups of rubber-like material are disposed generally in alternative arrangement, although this disposition is not strictly required. According to the present invention, the contact of the rubber-like cups with the cylinder walls is limited by the leather cups, which are stiffer than the rubber-like cups so that the latter do not have an opportunity to become bound or seized, and at the same time the cups of rubber-like material prevent any leakage when the unit stands under no load. Under load both the leather cups and the cups of rubber-like material cooperate to prevent any loss of liquid, even under long sustained loads. The cups of rubber-like material are generally oil-proof, whereby their ability to prevent any seepage is increased, and the leather cups are usually fairly stiff so as to reenforce the other cups and prevent their becoming displaced when under heavy loads.

Another object of the present invention is the provision of new and improved packing means embodying generally V-shaped packing members, with packing rings and spreaders of similar shape, together with means, such as a nut, for preloading the packing, and it is a further object of the present invention to provide the clamping nut with openings so as to lead the fluid under pressure into more intimate contact with the packing members and to prevent any localized areas of high pressure in the packing, as might otherwise occur if the flow of liquid to and from the packing is materially resisted.

These and other objects and advantages of the present invention will be apparent to those skilled in the art after a consideration of the following detailed description of the preferred embodiment, taken in conjunction with the accompanying drawing illustrating such embodiment.

In the drawing:

Figure 1 illustrates, by way of example, a hydraulic ram unit in which a piston or plunger is movable outwardly under hydraulic pressure to move or lift a load;

Figure 2 is an enlarged sectional view taken through the lower end of the piston or plunger of the unit shown in Figure 1; and Figure 3 illustrates a modified form of packing arrangement, this figure also showing the form of the spring washer before the clamping nut has been tightened to subject the packing to the desired preloading.

Referring now to the drawing, the unit 13 shown in Figure 1 corresponds to the ram unit disclosed and described in my copending application Serial No. 4728, filed February 4, 1935. The present invention is, of course, not limited to any particular form of ram unit or the like. The unit 13 includes a base 20 having a flanged pressure plate 21, and is threaded, as at 22, to receive the lower end of a plunger cylinder 23 in which a piston or plunger 24 is movable. A cylinder head 25 is threaded over the end of the cylinder 23 and carries any suitable form of conventional packing which receives and guides the outer end of the plunger 24. Secured to the outermost end of the latter is a load-engaging head 26 which has a serrated surface 27 so that the head will not readily slide off of the part with which it is in abutting engagement during a lifting or jacking operation. The head 26 is preferably removably secured in position on the outer end of the plunger 24 by any suitable means, as by a threaded connection or by a pin or the like. The fluid, indicated by the reference numeral 30, in the pressure end of the cylinder 23, is forced in under pressure through a flexible hose 31 having a removable connection at 32 with the base 20. A pump or other source of fluid under pressure is connected with the outer end of the hose 31, and, in operation, the pump or other unit forces liquid under pressure into the cylinder 23, thereby moving the plunger 24 outwardly.

In any successful operation of a ram unit or similar device as just described, a great deal depends upon the type of packing between the lower or pressure end of the piston or plunger 24 and the inner walls of the cylinder 23. According to the principles of the present invention, I employ a leather packing member or members, so as to insure a liquid-tight but freely movable packing under high pressures, and oil-proof packing means of rubber-like material adjacent or between the leather member or members so as to prevent leakage or seepage past the latter, and especially during the time that the unit is not under load.

Referring now more particularly to Figure 2, the lower or inner end of the piston or plunger 24 is reduced, as at 35, and this leaves a shoulder 36. The outermost end of the reduced portion 35 is threaded as at 37. Against the shoulder 36 is mounted a packing spacer ring or backing member 40, preferably but not necessarily of brass, which is of slightly greater diameter than the plunger 24 and which is provided with a generally V-shaped packing receiving surface 42. In the preferred form of construction, a pair of leather V-packing rings or members 43 are disposed with the first in direct engagement with the packing receiving surface 42 and the other in direct contact with the first member. Adjacent the second leather V-packing member is disposed a third member 45 which is also V-shaped and is preferably formed of rubber or rubber-like material having appreciably greater flexibility than the leather members 43, and which is oil-proof. A packing spreader 48 is placed against the rubber-like member 45, and the member 48 has a generally V-shaped surface 50 facing the other packing receiving surface 42. Thus, when the member 48 is forced toward the member 40, the packing rings 43 and 45 are placed under compression to secure the desired amount of preloading, whereby the packing members are forced outwardly into firm liquid-tight contact with the interior walls of the cylinder 23.

The means for compressing the packing members 43 and 45 consists of a spring washer and a nut threaded onto the end 37 of the plunger or piston 24. The spring washer is indicated by the reference numeral 55 in Figures 2 and 3 and, as best shown in Figure 2, is of a diameter slightly less than the interior diameter of the cylinder 23. The washer, when not stressed, takes the shape shown in Figure 3. The clamping nut is indicated by the reference numeral 57 and is threaded onto the end 37 of the piston 24 as mentioned above. The portion of the nut 57 that engages the spring washer is provided with a peripheral or circumferential groove 60 cut in the face of the nut 57 that is engaged by the spring washer 55, and a plurality of generally axially directed openings 62 are formed in the nut 57 and serve to establish communication between the peripheral groove 60 and the pressure side of the plunger 24. A plurality of radial kerfs 63 are cut in the outer side of the nut 57 where the openings 62 terminate. These kerfs not only provide for the use of a tool in tightening the nut 57 initially, but, in addition, one of them is adapted to receive a locking pin 65 which may be placed in a bore 66 formed in the outer end of the piston 24, as best shown in Figure 2, to prevent accidental loosening of the clamping nut 57.

The nut 57 is tightened either before or after the insertion of the piston assembly 24 in the cylinder 23, but in order to provide a substantially leak-proof unit, the nut 57 is tightened an appreciable amount in order to subject the packing members 43 and 45 to a considerable degree of preloading. The groove 60 and the bores 62 provide for movement of the oil from and to the packing members. This permissive flow tends to equalize pressures, especially as between loaded and no-load conditions, so that there will be no tendency for liquid under pressure or any entrapped air to be retained within the packing itself.

In Figure 2 is illustrated an arrangement in which two leather packing rings and one oil-proof ring are employed. In Figure 3 I have illustrated a construction employing an alternative arrangement in which three leather packing rings or cups are used with two oil-proof rubber-like cups disposed in between three leather members. As mentioned above, Figure 3 also illustrates the form of the spring washer before the same is pressed practically flat by the tightening of the clamping nut 57. The leather of the leather cups, such as 43, is normally porous, but upon being compacted by pressure the pores tend to close. But as the leather is inherently fibrous, it does not tend to flow under such pressure.

The rubber of the rubber cups, such as 45, is not porous but is always tight whether under pressure or not. However, it will flow under pressure acting like a viscous resilient liquid in being readily displaceable but substantially uncompressible. By making the rubber packing relatively thin and wide, the area of contact with the bore of the cylinder is limited to a small area, but the pressure of the preloading spring and of the applied fluid pressure is exerted on a large area. Hence, even though the rubber wears away at its edge, the displacement of rubber from the body toward the edge tends to keep the seal continuously tight. Also, because of the thinness of the rubber cup and the close support of the edges of the rubber by the leather cups, the tendency to vulcanize the rubber to the metal of the bore is reduced and its effect substantially neutralized.

While I have shown and described above the preferred structures in which the principles of the present invention have been illustrated, it is to be understood that, in fact, widely different means may be employed in the practice of the broader aspects of my invention.

What I claim, therefore, and desire to secure by Letters Patent is:

In a piston construction, a piston having a reduced threaded end, a packing spacer ring disposed over said reduced end and having a packing receiving surface, a packing spreader also disposed over said reduced end, packing means disposed between said spreader and ring, a spring washer seated against the spreader opposite said packing, and a clamping nut seated against said spring washer and threaded onto said reduced piston end, the face of said nut contacting with said spring washer having a circumferential groove formed therein and a plurality of generally axially directed oil holes communicating with said groove and adapted to conduct liquid from in front of the piston into said circumferential groove and into contact with said spring washer.

EDWARD M. PFAUSER.